(12) United States Patent
Laskaris et al.

(10) Patent No.: US 12,138,500 B2
(45) Date of Patent: Nov. 12, 2024

(54) FIRE TRUCK VALVE CHECKER SYSTEM AND METHOD

(71) Applicant: Hale Products, Inc., Collegeville, PA (US)

(72) Inventors: Michael A. Laskaris, Collegeville, PA (US); Jason Cerrano, Wentzville, MO (US)

(73) Assignee: HALE PRODUCTS, INC., Collegeville, PA (US)

( * ) Notice: Subject to any disclaimer, the term of this patent is extended or adjusted under 35 U.S.C. 154(b) by 647 days.

(21) Appl. No.: 17/350,595

(22) Filed: Jun. 17, 2021

(65) Prior Publication Data

US 2021/0394002 A1 Dec. 23, 2021

Related U.S. Application Data

(63) Continuation-in-part of application No. PCT/US2020/057678, filed on Oct. 28, 2020.
(Continued)

(51) Int. Cl.
*A62C 35/68* (2006.01)
*A62C 31/00* (2006.01)
(Continued)

(52) U.S. Cl.
CPC .............. *A62C 37/50* (2013.01); *A62C 31/00* (2013.01); *F16K 37/0083* (2013.01)

(58) Field of Classification Search
CPC ......... A62C 37/50; A62C 31/00; A62C 35/68; F16K 37/0083; F16K 15/1823;
(Continued)

(56) References Cited

U.S. PATENT DOCUMENTS 615,689 A 12/1898 Eastes et al.
2,275,500 A 3/1942 Broadhurst
(Continued)

FOREIGN PATENT DOCUMENTS

CN 110743120 A 2/2020
DE 4009560 A1 * 9/1991 ............ B01J 19/002
(Continued)

OTHER PUBLICATIONS

Int'l Search Report and Written Opinion issued Oct. 12, 2021 in Int'l Application No. PCT/US2021/037905.
(Continued)

*Primary Examiner* — Brandi N Hopkins
(74) *Attorney, Agent, or Firm* — Panitch Schwarze Belisario & Nadel LLP

(57) ABSTRACT

A valve checker system includes a valve having a valve housing with an inlet side, an outlet side, and a valve element therebetween. The valve element is selectively and repeatably rotatable between a first closed position, wherein a seal is formed between the valve element and the valve housing, thereby substantially preventing fluid flow between the inlet and outlet sides, and an open position, wherein the seal is broken such that fluid flow is permissible between the inlet and outlet sides. The valve element is also selectively and repeatably rotatable within a discrete angle in a direction toward the open position, from the first closed position into a second closed position in which the seal is maintained between the valve element and the valve housing. A controller is operatively coupled to the valve element and configured to rotate the valve element between the first and second closed positions.

20 Claims, 4 Drawing Sheets

Related U.S. Application Data

(60) Provisional application No. 63/041,448, filed on Jun. 19, 2020.

(51) Int. Cl.
*A62C 37/50* (2006.01)
*F16K 31/04* (2006.01)
*F16K 37/00* (2006.01)

(58) Field of Classification Search
CPC .... F16K 15/1821; F16K 15/181; F16K 47/16; F16K 11/0873; F16K 1/16; F16K 31/047; F16K 5/0647; F16K 29/00; F04D 9/041; E21B 34/025; E21B 34/16; E21B 34/00; E21B 34/06; B01J 19/00; C08F 2/18
See application file for complete search history.

(56) References Cited

U.S. PATENT DOCUMENTS

| | | | |
|---|---|---|---|
| 2,275,501 A | 3/1942 | Broadhurst | |
| 2,275,502 A | 3/1942 | Broadhurst | |
| 2,961,968 A | 11/1960 | Thomas | |
| 4,337,830 A | 7/1982 | Eberhardt | |
| 4,914,371 A | 4/1990 | Shibata et al. | |
| 5,491,978 A | 2/1996 | Young et al. | |
| 5,536,147 A | 7/1996 | Lang | |
| 5,729,102 A | 3/1998 | Gotou et al. | |
| 5,739,651 A | 4/1998 | Miyazawa et al. | |
| 5,797,421 A | 8/1998 | Merrett | |
| 5,838,124 A | 11/1998 | Hill | |
| 5,847,530 A | 12/1998 | Hill | |
| 5,872,434 A | 2/1999 | Hill | |
| 6,034,493 A | 3/2000 | Boyd et al. | |
| 6,152,689 A | 11/2000 | Yokota et al. | |
| 6,170,412 B1 | 1/2001 | Memory et al. | |
| 6,182,588 B1 | 2/2001 | Bodie et al. | |
| 6,239,564 B1 | 5/2001 | Boe et al. | |
| 6,250,889 B1 | 6/2001 | Shepard | |
| 6,586,898 B2 | 7/2003 | King et al. | |
| 6,682,313 B1 | 1/2004 | Sulmone | |
| 6,982,534 B2 | 1/2006 | Hahn et al. | |
| 7,064,513 B2 | 6/2006 | Fenley | |
| 7,102,306 B2 | 9/2006 | Hamaoka et al. | |
| 7,205,738 B2 | 4/2007 | Chapman et al. | |
| 7,287,963 B2 | 10/2007 | Basora | |
| 7,315,142 B2 | 1/2008 | Lindemann et al. | |
| 7,331,769 B2 | 2/2008 | Weis et al. | |
| 7,514,894 B2 | 4/2009 | Hoogzaad | |
| 7,530,404 B2 | 5/2009 | Lenz, Jr. | |
| 7,573,224 B2 | 8/2009 | Crabill et al. | |
| 7,609,016 B2 | 10/2009 | Kraus | |
| 7,764,032 B2 | 7/2010 | Crabill et al. | |
| 7,845,914 B2 | 12/2010 | Engelbrecht et al. | |
| 7,874,373 B2 | 1/2011 | Morrow et al. | |
| 8,075,282 B2 | 12/2011 | Huegerich et al. | |
| 8,159,171 B2 | 4/2012 | Cheng | |
| 8,226,372 B2 | 7/2012 | Hamaoka et al. | |
| 8,237,385 B2 | 8/2012 | Street | |
| 8,339,077 B2 | 12/2012 | Brown | |
| 9,175,686 B2 | 11/2015 | Johnson | |
| 9,190,940 B2 | 11/2015 | Markham | |
| 9,317,019 B2 | 4/2016 | Huang | |
| 9,413,276 B2 | 8/2016 | Miller | |
| 9,587,641 B2 | 3/2017 | Mettler et al. | |
| 10,056,852 B2 | 8/2018 | Matthews et al. | |
| 10,632,489 B1 * | 4/2020 | Wang | F16K 29/00 |
| 2004/0177975 A1 | 9/2004 | Laskaris et al. | |
| 2005/0077057 A1 | 4/2005 | Laskaris | |
| 2005/0271518 A1 | 12/2005 | Beyer et al. | |
| 2006/0207659 A1 | 9/2006 | Shaefer et al. | |
| 2007/0286736 A1 | 12/2007 | Grady et al. | |
| 2008/0099213 A1 | 5/2008 | Morrow et al. | |
| 2010/0065286 A1 | 3/2010 | Hosfield | |
| 2011/0256005 A1 | 10/2011 | Takeoka et al. | |
| 2011/0279070 A1 | 11/2011 | Tanaka et al. | |
| 2012/0200244 A1 | 8/2012 | Otokawa et al. | |
| 2013/0169196 A1 | 7/2013 | Markham | |
| 2019/0073256 A1 | 3/2019 | Iwami et al. | |
| 2019/0277010 A1 | 9/2019 | Laskaris | |
| 2020/0116170 A1 * | 4/2020 | Schmidt | F16K 37/0041 |
| 2020/0158115 A1 | 5/2020 | Mei | |

FOREIGN PATENT DOCUMENTS

| | | |
|---|---|---|
| JP | H02150581 A | 6/1990 |
| WO | 2017024272 A1 | 2/2017 |

OTHER PUBLICATIONS

Written Opinion of the International Examining Authority, issued Sep. 2, 2022 in Int'l Application No. PCT/US2021/037905.
Int'l Preliminary Report on Patentability issued Oct. 20, 2022 in Int'l Application No. PCT/US2021/037905.
Int'l Search Report and Written Opinion issued Mar. 12, 2021 in Int'l Application No. PCT/US20/57678.

* cited by examiner

FIRE TRUCK VALVE CHECKER SYSTEM AND METHOD

CROSS-REFERENCE TO RELATED APPLICATIONS

This application claims priority from U.S. Provisional Patent Application No. 63/041,448, titled "Fire Truck Valve Checker", filed on Jun. 19, 2020, and International Application No. PCT/US20/57678, titled "System And Method For Use In Operation Of A Firefighting Vehicle", filed Oct. 28, 2020, the entire contents of each of which are incorporated by reference herein.

BACKGROUND OF THE DISCLOSURE

The present invention relates to a system and method for checking the operability of fire truck valves. More particularly, the present invention relates to a fire truck valve checker and a method of using the fire truck valve checker to validate the operability of one or more fire truck valves.

Valves of various types experience sticking when they have been sitting for a while without operating, which subsequently makes them hard to operate. This is particularly concerning in Fire Apparatus pumps and valves where individual valves may not be actuated for a considerable period of time between uses. This is characteristic of power and mechanically operated ball valves and butterfly valves used in a pumper type fire apparatus where the valve sits for long periods of time in between use.

Pumper truck valves typically have a softer sealing element that can stick to a harder valve element. Different materials are used to minimize this phenomenon; nonetheless valves can still stick and not operate when needed. Should this be the case of a power operated valve, the stuck valve might trip a breaker or stall a motor. Stuck manually operated valves can be so difficult to operate that the valve fails to open under pressure. The longer a valve sits without being used, the more the materials tend to stick to each other, sometimes thru 'plastic creep' of the two adjacent materials. The materials can flow into the pores of the mating part binding them together. Lubrication is used to prevent sticking, but lubrication is difficult to achieve in a mobile fire apparatus that has limitations on size and weight. It is known to apply lubrication to ball valve designs on fire apparatus applications. Even with lubrication sticking or seizing can occur when a valve is not moved over longer periods of time. In the case of rubber seated valves, the rubber appears to vulcanize to the mating part.

Additionally, the valve mechanical actuator and/or its electrical connections whether they be via J1939 CAN network or individual hardwired connection are subject to wear and damage like any other component. Accordingly, a mechanical or electrical issue can contribute to a stuck valve. For instance, a weak ground connection that has been subject to corrosion from road salt or other means, may reduce the effective power available to the motor which decreases the motor output torque and makes it more likely that the valve will be unable to move when needed after sitting a long time. Similar risk of issues applies to all the mechanical interconnects, couplings, gears and electrical interconnects, switches, wires, etc.

Furthermore, an operator is not necessarily at the vehicle every day and the number of fire events per year is decreasing over time (based on readily available reporting), valves can remain untested and possibly stuck or otherwise non-functioning over time and may not be detected until the fire department operator needs to use them in an emergency situation.

Accordingly, there is a need to assure the operability of pumper truck valves when needed after a long idle period.

BRIEF SUMMARY OF THE DISCLOSURE

Briefly stated, one aspect of the present disclosure is directed to a valve checker system including a valve having a valve housing with an inlet side, an outlet side, and a valve element positioned therebetween. The valve element is selectively and repeatably rotatable between (i) a first closed position, wherein a seal is formed between the valve element and the valve housing, thereby substantially preventing fluid flow between the inlet side and the outlet side, and (ii) an open position, wherein the seal is broken such that fluid flow is permissible between the inlet side and the outlet side. The valve element is also selectively and repeatably rotatable within a discrete angle in a direction toward the open position, from the first closed position into a second closed position in which the seal is maintained between the valve element and the valve housing. A controller is operatively coupled to the valve element and configured to rotate the valve element between the first closed position and the second closed position.

In one configuration, the controller is configured to periodically rotate the valve element between the first closed position and the second closed position.

In any of the previous configuration, a valve seat may be mounted within the valve housing, and the valve element may be a ball having a peripheral surface and a port extending through the ball, wherein the seal is formed between the peripheral surface of the ball and the valve seat such that the port is fluidly disconnected from the inlet side and the outlet side of the valve housing in both the first closed position and the second closed position, and the port is in fluid communication with the inlet side and the outside in the open position, such that fluid flow is permissible between the inlet side and the outlet side through the port.

In any of the previous configurations, the discrete angle may be between approximately 4 degrees and approximately 9 degrees.

In any of the previous configurations, the valve may be a butterfly valve, and the valve element may be a disc. In one configuration, the disc may be coated with a polymeric coating configured to form the seal between the disc and the valve housing. In one configuration, the polymeric coating may include a nitrile rubber coating. In one configuration, the disc may be a double flanged disc, having upper end and lower end peripheral flanges forming the seal between the disc and the valve housing.

In any of the previous configurations, the valve checker system may further include a motor operatively coupled to the controller and to the valve element, the motor being configured to rotate the valve element. In any of the previous configurations, the valve checker system may further include a position sensor operatively coupled to the controller and the valve element, the position sensor being configured to detect position information of the valve element and transmit the position information to the controller, the controller being further configured to determine valve malfunction when power is supplied to the motor and the position information remains unchanged. In any of the previous configurations, the controller may be further configured to determine valve malfunction when a current drawn by the motor exceeds a predetermined threshold current.

In any of the previous configurations, the valve checker system may further include a limit switch operatively coupled to the controller and the valve element, the limit switch configured to change states when the valve element is rotated from the first closed position, the controller being further configured to determine valve malfunction when power is supplied to the motor with the valve element in the first closed position and the state of the limit switch remains unchanged.

In any of the previous configurations, the valve may be a fire truck pumper valve.

Another aspect of the present disclosure is directed to a network of fire truck pumper valves having a plurality of the valve of any of the previous configurations, the respective valve element of each valve being selectively and repeatably rotatable between the first closed position thereof and the second closed position, wherein the controller is configured to rotate the respective valve element of each valve between the first closed position and the second closed position thereof.

Another aspect of the present disclosure is directed to a method of preventing valve stiction of the valve of any of the previous configurations, the method including the steps of rotating the valve element of the valve from the first closed position thereof to the second closed position thereof and rotating the valve element from the second closed position thereof to the first closed position thereof.

In one configuration, the method may further include the step of periodically repeating both rotating steps.

In any of the previous configurations of the method, a motor and a position sensor may each be operatively coupled to the controller and to the valve element, the motor being configured to rotate the valve element, wherein each of the rotating steps comprises supplying power to the motor to rotate the valve element, and the method may further include the steps of: detecting position information of the valve element via the position sensor; transmitting the position information to the controller; and determining valve malfunction, via the controller, if the position information remains unchanged.

In any of the previous configurations of the method, a motor may be operatively coupled to the controller and to the valve element, the motor being configured to rotate the valve element, wherein each of the rotating steps comprises supplying power to the motor to rotate the valve element, and the method may further include the step of determining valve malfunction, via the controller, if a current drawn by the motor exceeds a predetermined threshold current.

In any of the previous configurations of the method, a motor and a limit switch may each be operatively coupled to the controller and to the valve element, the motor being configured to rotate the valve element and the limit switch being configured to change states when the valve element is rotated from the first closed position, wherein the step of rotating the valve element from the first closed position thereof to the second closed position thereof includes supplying power to the motor to rotate the valve element, and the method may further include the step of determining valve malfunction, via the controller, if the state of the limit switch remains unchanged.

Another aspect of the present disclosure is directed to a method of preventing valve stiction of a network of fire truck pumper valves including a plurality of the valve of any of the previous configurations, the method including the steps of rotating the respective valve element of each valve from the first closed position thereof to the second closed position thereof and rotating the respective valve element of each valve from the second closed position thereof to the first closed position thereof.

BRIEF DESCRIPTION OF THE SEVERAL VIEWS OF THE DRAWINGS

The following description of embodiments of the invention will be better understood when read in conjunction with the appended drawings. It should be understood, however, that the invention is not limited to the precise arrangements and instrumentalities shown. In the drawings.

DETAILED DESCRIPTION OF THE DISCLOSURE

Figure 1:
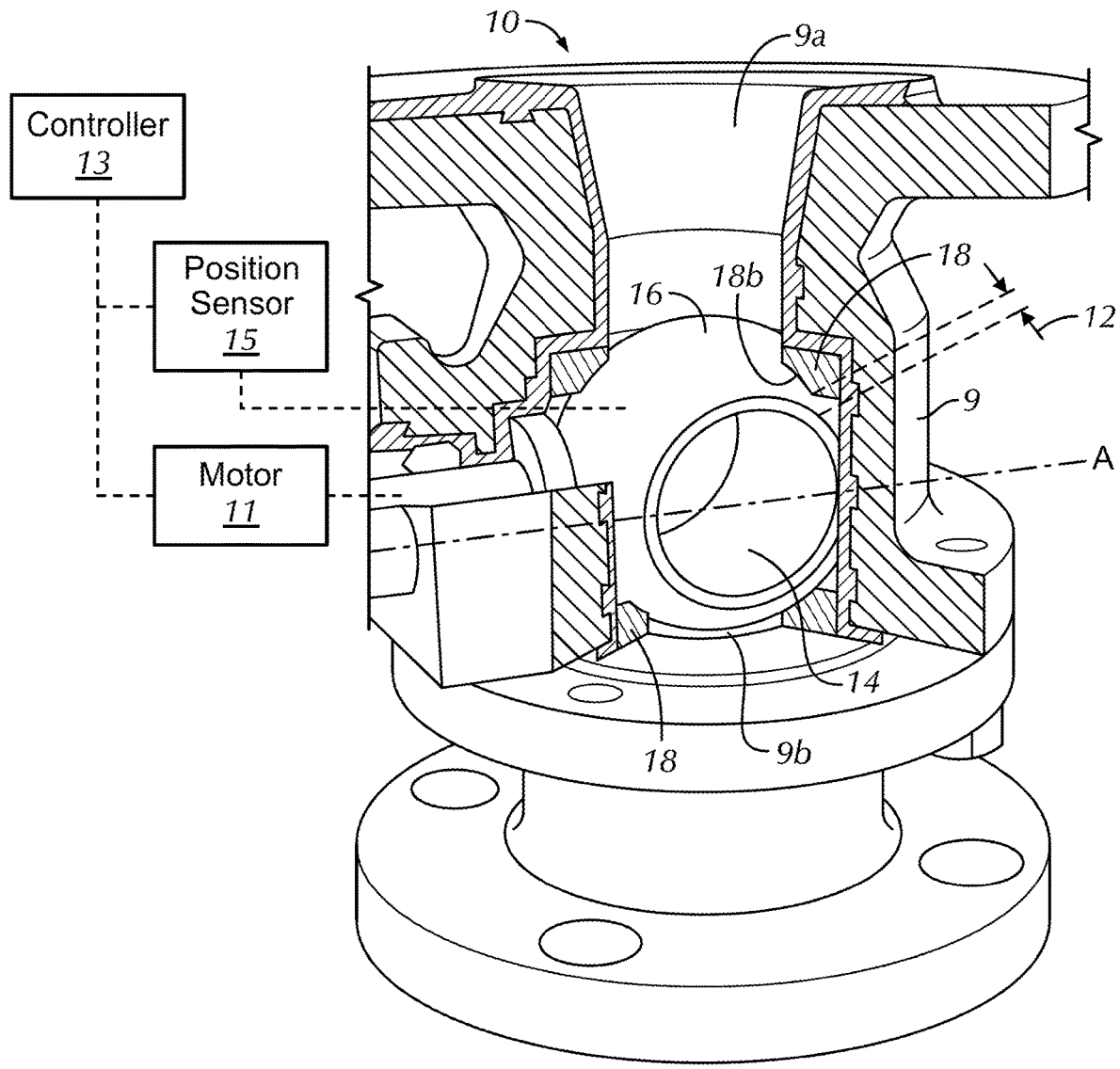
FIG. 1 is a left side perspective and partial schematic and sectional view of a valve checker system in accordance with a first embodiment of the present disclosure, employing a ball valve, the ball valve being in a first, fully closed position thereof.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the valve, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 2:
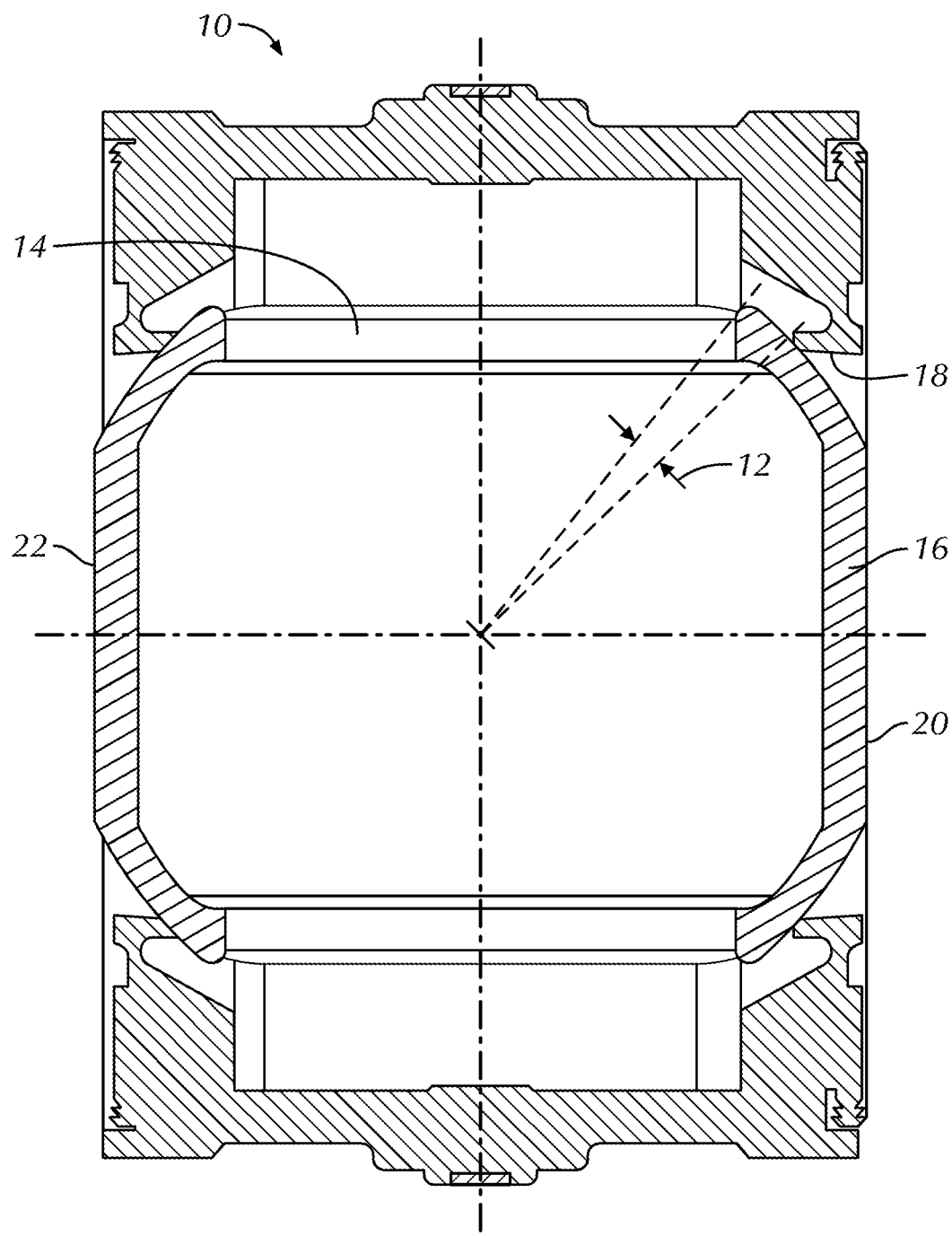
FIG. 2 is a cross-sectional view of the ball valve of FIG. 1, in the fully closed position thereof.
Figure 3:
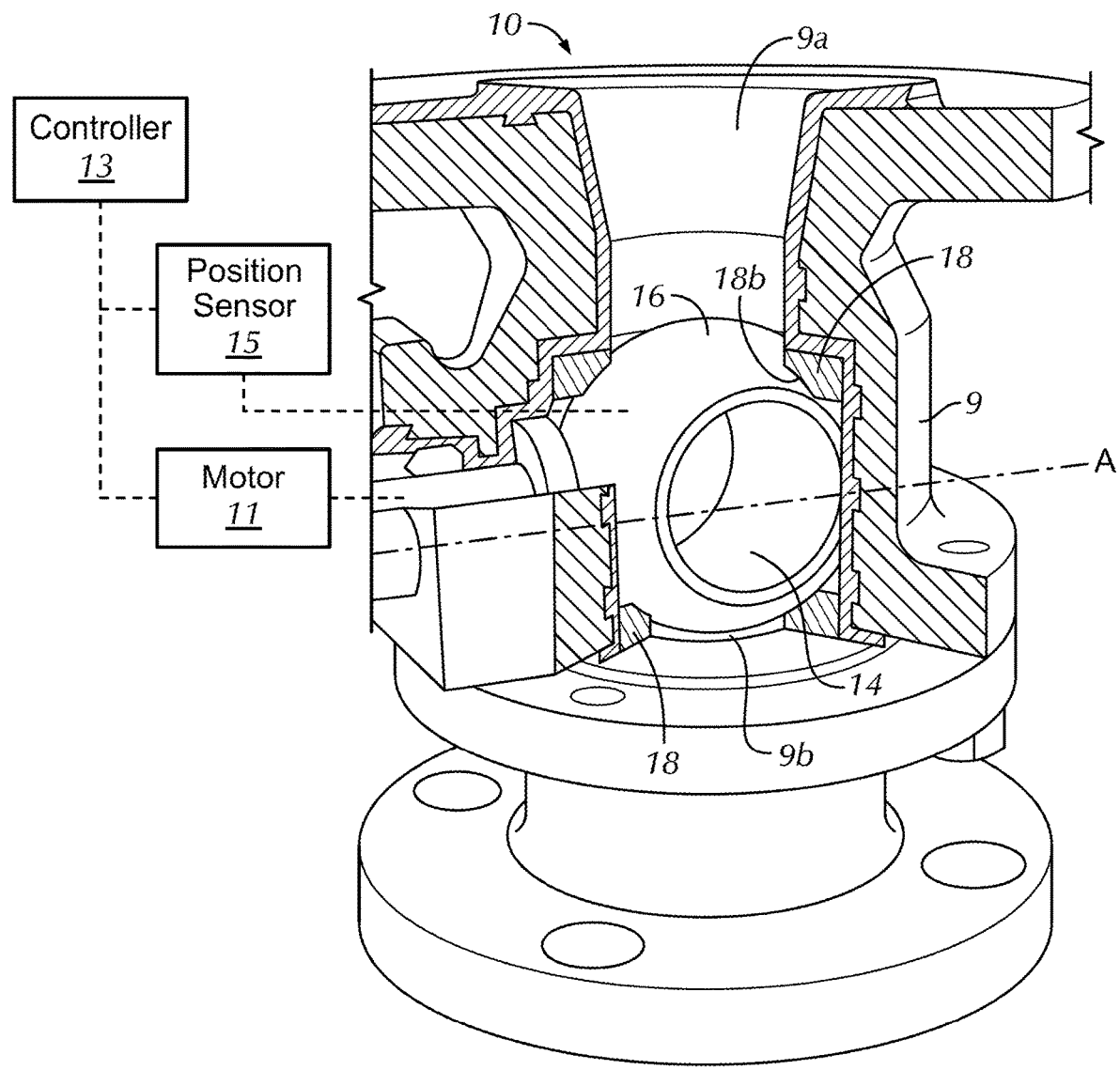
FIG. 3 is a left side perspective and partial schematic and sectional view of the valve checker system of FIG. 1, the ball valve being in a second closed position thereof.

Referring to the drawings in detail, wherein like numerals indicate like elements throughout, there is shown in FIGS. 1-3 a valve checker system including at least one industrial ball valve 10 and an accompanying operatively connected controller 13 configured to check, validate and maintain the operability of the valve 10, in accordance with a first embodiment of the present disclosure. The valve 10 is suitable for use as pumper fire valve of a fire truck (not shown).

A generic floating industrial ball valve 10 is shown in FIGS. 1 and 2. As should be understood, the ball valve 10 includes a valve housing 9, having an inlet 9a and an outlet 9b. The valve housing 9 houses a bored out, or otherwise hollow, and rotating/pivoting ball 16 therein. A valve seat 18, i.e., an annular seat ring, underlies the ball 16 on an inlet side 20 thereof and an opposing valve seat 18 is positioned upon the ball 16 on an outlet side 22 thereof. The rotatable ball 16 defines a port or channel 14 therethrough (or may be otherwise hollow). The valve seats 18 on each of the upstream/inlet 20 and downstream/outlet 22 sides of the ball 16 are effectively stationary with respect to the valve housing 9. As should be understood by those of ordinary skill in the art, the valve seats 18 may be formed of metal(s), polymer(s), combinations thereof, or the like. As also should be understood, the valve seats 18 are configured to seal off and substantially prevent fluid from flowing around the ball 16 between an upstream side 20 and a downstream side 22 thereof, thereby limiting fluid to travel through the ball port 14 in order to travel between the upstream side 20 and the downstream side 22 thereof. The ball 16 is rotatable between an open position thereof (not shown) and a fully closed position, i.e., a first closed position, thereof (FIG. 1) in a manner well understood by those of ordinary skill in the art. In the open position, the ball port 14 is in fluid communication with both the upstream inlet 9a and the downstream outlet 9b, such that fluid may flow between the upstream and downstream inlets and outlets 9a, 9b through the ball 16. In the first closed position, the ball port 14 is fluidly disconnected from the upstream and downstream inlet and outlet 9a, 9b.

In one configuration, the valve 10 may be electrically power actuated. Alternatively, the valve may be air power operated, e.g., by using a three-position air cylinder that allows the valve 10 to move as needed, e.g., a small amount for valve checking (as described in further detail below) or the full operational valve movement. In such configurations, the controller 13 is employed to power the necessary components in a manner well understood by those of ordinary skill in the art and further described below. Additionally, or alternatively, the valve 10 may also be manually operated, e.g., by adding a short stroke air actuator (not shown) that can move the valve 10 through the small rotation needed to check the valve operation and prevent sticking (as described below). Such actuation may be built into the valve 10 or the manual actuator and incorporates a lost motion mechanical linkage to allow full travel of the valve to be operated manually through the full range of motion.

Generally, power actuated valves employed in fire trucks have mechanical clearances between the interrelated components that form the valve. That is, for example, the valve 10 may be designed so that the ball 16 can move a certain/discrete angle of rotation relative to the valve seat(s) 18, i.e., to a second closed position (FIG. 3), with the valve 10 remaining closed, i.e., with the seal remaining intact before the seal is un-ported and fluid begins to flow. It is beneficial to be able to move the valve element, e.g., the ball 16 (or disc as described below), a discrete angular amount (from the first closed position to the second closed position) before the seal is broken, and, therefore, without allowing fluid to flow, as there may be water or water/firefighting agent solution on the other side of the valve, which may otherwise spill into a preconnected hose (not shown) or onto the ground.

In the illustrated embodiment, the ball valve 10 has a measurable displacement 12 between the ball port 14 and an inner peripheral edge 18b of each valve seat 18 within the valve housing 9. That is, the ball 16 can move a discrete angle of rotation (from the first closed position to the second closed position) while remaining closed, i.e., before the port (or hole) 14 in the ball 16 breaches the inner peripheral edge 18b of the valve seat 18 and permits flow between the inlet 9a and the outlet 9b of the valve housing 9, through the ball port 14. The displacement 12 translates to the permissible angle of rotation of the ball 16 about a rotational axis A, while maintaining the seal between the ball 16 and the valve seat 18, before flow may begin. The angle of rotation between the first and second closed positions may be different for different types or designs of valves. Accordingly, by managing the relationship between the hole 14 in the ball 16 and the inner peripheral edge 18b of the seat 18, the valve 10 can be designed to permit more or less movement of the ball 16 while remaining closed, before the seal is un-ported and flow begins. In one example, without limitation, a Model 8825, two-and-a-half-inch Generation II Heavy Duty "Self Locking" Swing-Out Ball Valve, sold by Akron® Brass Company (the Model 8825 valve), is designed to permit the rotatable ball of the valve to rotate nine degrees before the valve opens and allows fluid flow through the valve. That is, the valve remains closed until the ball is rotated past nine degrees.

The controller 13 operatively connected with the valve 10 may actuate, e.g., electrically, the valve 10 to move a predetermined amount between the open and closed positions thereof. The controller 13 may act on the ball 16 by activating a motor 11, e.g., a DC motor, coupled to the ball 16 for effecting rotation thereof about the rotational axis A. In one embodiment, for example, without limitation, the controller 13 may take the form of a SAM™ Control System sold by Hale Products Inc. integrated into the fire pump, which is configured to manage a fire truck's pump, tank, intakes and discharges. Alternatively, the controller 13 may take the form of a Class 1 Sentry Pressure Governor System sold by Hale Products Inc. or a Total Pressure Governor (TPG) sold by Hale Products Inc.

In a valve-check mode, the controller 13 may periodically, e.g., during times when the pump(s) (not shown) is not engaged and is not pressurized, actuate the valve 10 between the first (FIG. 1) and second (FIG. 3) closed positions thereof, i.e., move the ball 16, a discrete, incremental amount less than the measurable displacement 12 between the ball port 14 and the interior periphery 18b of each valve seat 18, to take up the clearance in the valve 10. As should be understood by those of ordinary skill in the art, the pump(s) is not pressurized when not connected with a water source, such as when the truck is sitting idle or driving down the road. Accordingly, residual pressure behind the valve(s) is minor head pressure of any residual water that might be in the pump(s).

The valve 10 may also be configured to have position feedback. For example, a position sensor 15 may be employed in a conventional manner to detect change in position of the ball 16 (the movable valve element) and transmit the information to the controller 13 (in a manner well understood by those of ordinary skill in the art). Thus, the controller 13 may determine whether, and how much, the ball 16 has moved. The controller 13 may be configured to move the ball 16 a certain amount based on the feedback provided by the position sensor 15. For example, in the Akron Brass Co. Model 8825 valve, the controller 13 may be configured to move the ball 16 less than 9 degrees, e.g., 5-6 degrees, toward the open position (which will still prevent fluid from flowing through the valve 10) and then move the ball 16 back to the fully closed position. This movement allows the ball 16 to be moved a small amount to avoid and/or 'break' stiction, i.e., the friction which tends to prevent stationary surfaces from being set in motion relative to each other, with the valve seat 18. Additionally, or alternatively, the valve 10 may employ a limit switch, as described further below.

In a vehicle setting, such as a fire truck setting where multiple valves are employed, the control system to check and/or actuate the valves can be deployed to a networked arrangement of valves (not shown) to command the valves to operate through the valve checker routine or can be applied to the valves individually as part of a standalone valve routine. For example, the controller 13 may cycle through the valves 10 in series in the valve-check mode, so that the electrical load on the electrical system of the vehicle/apparatus does not encounter an excessive load. Different valves have different dwell times that determine how long they can be unactuated before they begin to stick. Accordingly, the controller 13 may be configured to conduct the valve-check on the valves periodically according to the particular valves employed and before stiction occurs. Typically, one valve-check per valve per day is an average frequency, but the disclosure is not so limited. For example, smaller valves with more rigid seats can last longer times between being moved. Different valves also may require a different amount of valve movement to prevent sticking. Accordingly, the controller 13 may also be configured to move the valve(s) a discrete amount, respectively, corresponding to the design of the particular valve(s).

Advantageously, the combination of powered operation/actuation of a valve, i.e., via the controller 13, and position sensing feedback, enables detection of valve malfunction prior to actual, necessary use. That is, for example, if the controller 13 commands the motor 11 to move the ball 16 and the position sensor 15 detects that the ball 16 does not move, the feedback of the position sensor 15 to the controller 13 will indicate a malfunction, e.g., electrical or mechanical, because the expected position change from the valve 10 was not obtained. Accordingly, defects, such as, for example, without limitation, a broken motor or a number of other mechanical failures or malfunctioning electronics can be detected. A communication platform connected with the controller 13, such as Captium™ sold by IDEX Fire and Safety, may be employed to communicate warnings or service alerts to a local and/or remote operator, in a manner well understood by those of ordinary skill in the art. This allows scheduling a preventative troubleshooting and service action to fix the defect before the valve is needed at an emergency and a problem is experienced by the operator, or the valve can be tagged out of service and not used until it is repaired. Advantageously, such action on each valve 10 can be accomplished while the pumper truck/vehicle is sitting idle or on the road, without impacting other activity.

Optionally, electronics hardware (not shown) may additionally or alternatively be employed to detect valve actuation motor current, thereby providing electrical feedback. As one example, electric actuator Model No. 8615-8635 sold by Akron® Brass Company, a valve actuator/controller that measures current draw of the motor as part of the controller design in order to set valve stop positions (as known to those skilled in the art), may be employed. Excessive motor current detection indicates valve malfunction and may be reported (as described above). For example, if the maximum motor current for a valve 10 is approximately 10 amps, the current draw to actuate the valve 10 without pressure on the valve, i.e., when not connected with a water source (as the valve 10 would be when checked), is much less at 4 amps. Therefore, if the electronics hardware detects that valve actuation is requiring more than 4 amps at nominal voltage, a malfunction is identified by the controller 13. Whether the issue is mechanical malfunction or electrical, the problem may be reported to avoid malfunction during an emergency situation. The controller 13 may also be configured to adjust for current draw and position feedback to learn or self-calibrate how much current each valve needs to move to its checking position, and then when a valve needs more current it can identify a deteriorating problem over time. By measuring the voltage in the power supply and the current required to move the valve a map of known good ranges can be developed so when a valve needs more current to move over a number of automatic checks, a future need for maintenance can be extrapolated.

As previously described, employing the position sensor 15 assists with malfunction detection. For example, if power is supplied to the motor 11 and the position sensor 15 detects no position change of the valve 10, then there is a functional, i.e., mechanical or electrical, problem. Further advantageously, combining the position feedback with the electrical feedback may assist in also identifying the type of functional malfunction present. For example, if power is applied to the motor 11 and the electronics hardware detects substantially zero current draw and no position change of the valve 10, then the malfunction is likely an electrical malfunction. Alternatively, if power is applied to the motor 11 and the electronics hardware detects high current draw but there is no position change of the valve, then the malfunction is likely a mechanical malfunction.

As previously described, the valve checker system of the present disclosure provides multiple advantages. That is, the system operates valves, e.g., powered valves or manually actuated valves having a small motion actuator, a discrete amount that exercises each valve to help make sure it is not stuck but rather is fully operational when needed. The system is configured to move the valve(s) without opening the valve(s), i.e., without moving the valve to a position which permits any upstream water to flow therethrough. This is achieved by making sure a downstream pump is not spinning and that there is no pressure on the pump and also by moving the valve element only a small amount. The system is configured to automatically operate each valve on a regular, periodic basis when the pump is not being used. Such configuration includes exercising different size and type valves on different schedules to prevent sticking, as well as moving each valve a tailored, potentially different amount from other valves, to meet the requirements of each particular valve design. Accordingly, the system may be applied, i.e., customized, to individual valves or applied to a networked arrangement of valve.

Figure 4:
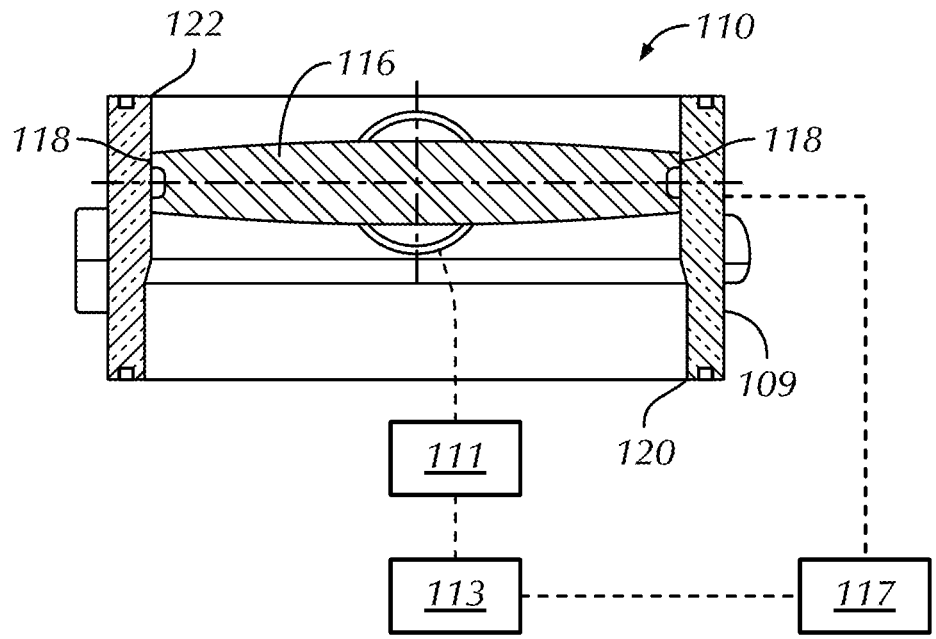
FIG. 4 is a cross-sectional and partial schematic view of a valve checker system, in accordance with a second embodiment of the present disclosure, employed a butterfly valve, the butterfly valve being in a first, fully closed position thereof.
Figure 5:
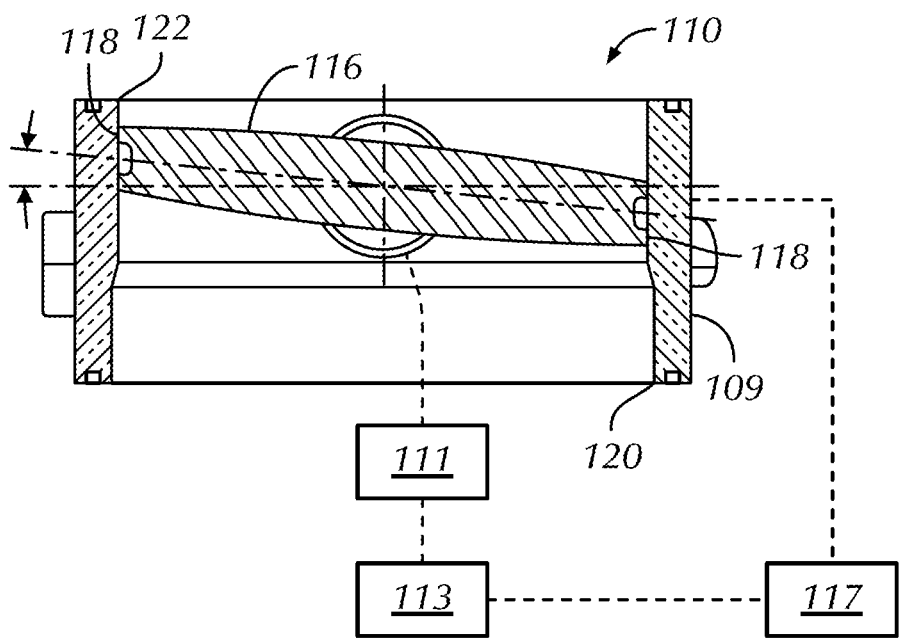
FIG. 5 is a cross-sectional and partial schematic view of the valve checker system of FIG. 3, the butterfly valve being incrementally rotated toward the open position from the first, fully closed position thereof into a second closed position thereof.

FIGS. 4 and 5 illustrate a second embodiment of the valve checker system of the present disclosure. The reference numerals of the present embodiment are distinguishable from those of the above-described embodiment by a factor of one-hundred (100), but otherwise indicate the same elements as indicated above, except as otherwise specified. The description of certain similarities between the embodiments may be omitted herein for the sake of brevity and convenience, and, therefore, is not limiting.

A primary difference between the first and second embodiments of the valve checker system of the present disclosure pertains to the valve employed as the pumper fire valve. The valve 110 takes the form of a butterfly valve, such as, for example, without limitation, a Master Intake Valve sold by Hale Products Inc. That is, and as should be understood by those of ordinary skill in the art, the valve 110 includes a valve housing 109 and a butterfly valve disc 116. The term "butterfly valve," as used herein, is sufficiently broad to cover any valve having a generally disc-shaped closure that is selectively pivotable, i.e., irrespective of pressure differential across the disc-shaped closure, about an axis along a cross-section of a pipe, i.e., perpendicular to the direction of fluid flow, between a fully closed position (FIG. 4) and an open position (as should be understood by those of ordinary skill in the art), to regulate fluid flow.

Another difference between the first and second embodiments of the present disclosure is that the valve seal 118 is formed as a component of the movable valve element rather than being a stationary component of, or mounted to, the valve housing 109. In the illustrated embodiment, the radial periphery of the valve disc 116 forms a valve seal 118. In one configuration, the disc 116 may be coated with a sealant, e.g., a polymeric coating, such as, but not limited to, nitrile rubber, to enhance the sealing properties of the disc 116. In the illustrated embodiment, as shown in FIGS. 4 and 5, the disc 116 takes the form of a double flanged disc, having upper end and lower end peripheral flanges forming the valve seals 118, but the disclosure is not so limited.

Similarly to the valve 10 of the first embodiment, the movable element, i.e., the disc 116 of the valve 110 can move a small, incremental angle of rotation (between the first and second closed positions thereof) while the valve remains closed and, therefore, before the seal between the disc 116 and the valve housing 109 is broken and permits flow between the inlet side 120 and the outlet side 122 of the valve housing 109. That is, in the illustrated embodiment, the disc 116 requires sufficient rotation to break both top and bottom seals 118 before the valve 110 opens. Accordingly, and similarly to the first embodiment, the controller 113 operatively connected with the valve 110 to actuate the valve 110 between the open and closed positions thereof may periodically, e.g., at times when the pump is not engaged and is not pressurized, actuate the valve 110 between the first and second closed positions thereof, i.e., rotate the disc 116, a discrete angle less than the angle required to open the valve, i.e., break the seal(s) between the disc 116 and the valve body 109 to avoid and/or break stiction.

The valve 110 may also employ at least one limit switch 117 operatively connected with the valve 110 and the controller 113 (in a manner well understood by those of ordinary skill in the art). As should be understood by those of ordinary skill in the art, the limit switch 117, e.g., on the valve actuator/stem, indicates when the valve 110 is fully closed, i.e., in the first closed position. As the disc 116 is incrementally rotated out of the fully closed position (toward the open position), the limit switch 117 changes state (in a manner well understood) according to the make-or-break dimensions of the electrical connection thereof.

For example, in one configuration, the limit switch 117 may be configured such that the electrical connection is broken when the disc 116 reaches the second, closed position thereof. Accordingly, the controller 113 may cut power to the motor 111 upon breaking of the limit switch 117, thereby ceasing disc 116 rotation. In one example, the limit switch 117 may be configured to change state (from make to break) when the disc 116 rotates between about 4 degrees and about 7 degrees from the fully closed position, which is sufficient rotation to break stiction between the disc 116 and the valve body 109 and verify that the valve actuation components are properly functioning. The motor 111, therefore, stops further rotation, and then the disc 110 can be returned to the fully (first) closed position in the reverse manner.

In another configuration, the limit switch 117 may be configured such that the electrical connection is broken prior to the disc 116 reaching the second, closed position thereof, i.e., the valve actuating components and the movable valve components are designed such that insufficient movement is attained when the limit switch changes state. In such a configuration, the controller 113 may be configured to continue powering the motor 111 for a predetermined, short period of time, e.g., between about one second and about two seconds, after breaking the limit switch 117 to allow the disc 116 to rotate between the about 4 degrees and about 7 degrees from the fully closed position. One factor affecting the predetermined period of time may be, for example, supply voltage to the motor 111. As should be understood by those of ordinary skill in the art, when the supply voltage is lower, the motor 111 turns more slowly and the number of rotations per second are reduced relative to higher supply voltage. To compensate, the timing of the power to the motor 111 is increased proportionally.

Similarly to the position sensor 15, the combination of powered operation/actuation of a valve, i.e., via the controller 113, and the limit switch 117, enables detection of valve malfunction prior to actual, necessary use. For example, if the controller 113 commands the motor 111 to move the disc 116 and the limit switch 117 does not change states, the feedback of the limit switch 117 to the controller 113 will indicate a malfunction, e.g., electrical or mechanical, because the expected change of state of the limit switch 117 was not obtained. Additionally, or alternatively, the valve 110 may employ a position sensor 15 as previously described.

It will be appreciated by those skilled in the art that changes could be made to the embodiments described above without departing from the broad inventive concepts thereof. It is understood, therefore, that this invention is not limited to the particular embodiments disclosed, but it is intended to cover modifications within the spirit and scope of the present invention, as set forth in the appended claims.

We claim:

1. A valve checker system comprising:
   a valve including:
      a valve housing having an inlet side, an outlet side, and a valve element positioned therebetween, the valve element being selectively and repeatably rotatable between (i) a first closed position, wherein a seal is formed between the valve element and the valve housing, thereby substantially preventing fluid flow between the inlet side and the outlet side, and (ii) an open position, wherein the seal is broken such that fluid flow is permissible between the inlet side and the outlet side,
      the valve element also being selectively and repeatably rotatable within a discrete angle in a direction toward the open position, from the first closed position into a second closed position in which the seal is maintained between the valve element and the valve housing; and
   a controller operatively coupled to the valve element and configured to rotate the valve element between the first closed position and the second closed position.

2. The valve checker system of claim 1, wherein the controller is configured to periodically rotate the valve element between the first closed position and the second closed position.

3. The valve checker system of claim 1, wherein a valve seat is mounted within the valve housing, and the valve element is a ball having a peripheral surface and a port extending through the ball, wherein the seal is formed between the peripheral surface of the ball and the valve seat such that the port is fluidly disconnected from the inlet side and the outlet side of the valve housing in both the first closed position and the second closed position, and the port is in fluid communication with the inlet side and the outside in the open position, such that fluid flow is permissible between the inlet side and the outlet side through the port.

4. The valve checker system of claim 1, wherein the discrete angle is between approximately 4 degrees and approximately 9 degrees.

5. The valve checker system of claim 1, wherein the valve is a butterfly valve, and the valve element is a disc.

6. The valve checker system of claim 5, wherein the disc is coated with a polymeric coating configured to form the seal between the disc and the valve housing.

7. The valve checker system of claim 6, wherein the polymeric coating comprises a nitrile rubber coating.

8. The valve checker system of claim 5, wherein the disc is a double flanged disc, having upper end and lower end peripheral flanges forming the seal between the disc and the valve housing.

9. The valve checker system of claim 1, further comprising a motor operatively coupled to the controller and to the valve element, the motor being configured to rotate the valve element.

10. The valve checker system of claim 9, further comprising a position sensor operatively coupled to the controller and the valve element, the position sensor being configured to detect position information of the valve element and transmit the position information to the controller, the controller being further configured to determine valve malfunction when power is supplied to the motor and the position information remains unchanged.

11. The valve checker system of claim 9, wherein the controller is further configured to determine valve malfunction when a current drawn by the motor exceeds a predetermined threshold current.

12. The valve checker system of claim 1, further comprising a limit switch operatively coupled to the controller and the valve element, the limit switch configured to change states when the valve element is rotated from the first closed position, the controller being further configured to determine valve malfunction when power is supplied to the motor with the valve element in the first closed position and the state of the limit switch remains unchanged.

13. The valve checker system of claim 1, wherein the valve is a fire truck pumper valve.

14. A network of fire truck pumper valves comprising:
a plurality of the valve of claim 1, the respective valve element of each valve being selectively and repeatably rotatable between the first closed position thereof and the second closed position,
wherein the controller is configured to rotate the respective valve element of each valve between the first closed position and the second closed position thereof.

15. A method of preventing valve stiction of the valve of claim 1, the method comprising the steps of:
rotating the valve element of the valve from the first closed position thereof to the second closed position thereof; and
rotating the valve element from the second closed position thereof to the first closed position thereof.

16. The method of claim 15, further comprising the step of periodically repeating both rotating steps.

17. The method of claim 15, wherein a motor and a position sensor are each operatively coupled to the controller and to the valve element, the motor being configured to rotate the valve element, wherein each of the rotating steps comprises supplying power to the motor to rotate the valve element, and further comprising the steps of:
detecting position information of the valve element via the position sensor;
transmitting the position information to the controller; and
determining valve malfunction, via the controller, if the position information remains unchanged.

18. The method of claim 15, wherein a motor is operatively coupled to the controller and to the valve element, the motor being configured to rotate the valve, wherein each of the rotating steps comprises supplying power to the motor to rotate the valve element, and further comprising the step of:
determining valve malfunction, via the controller, if a current drawn by the motor exceeds a predetermined threshold current.

19. The method of claim 15, wherein a motor and a limit switch are each operatively coupled to the controller and to the valve element, the motor being configured to rotate the valve element and the limit switch being configured to change states when the valve element is rotated from the first closed position, wherein the step of rotating the valve element from the first closed position thereof to the second closed position thereof comprises supplying power to the motor to rotate the valve element, and further comprising the step of:
determining valve malfunction, via the controller, if the state of the limit switch remains unchanged.

20. A method of preventing valve stiction of a network of fire truck pumper valves comprising a plurality of the valve of claim 1, the method comprising:
rotating the respective valve element of each valve from the first closed position thereof to the second closed position thereof; and
rotating the respective valve element of each valve from the second closed position thereof to the first closed position thereof.

* * * * *